United States Patent [19]
Yiu et al.

[11] Patent Number: 5,859,649
[45] Date of Patent: Jan. 12, 1999

[54] DATA PROCESSING SYSTEM HAVING DISPLAY CONTROLLER WITH BURSTING DIRECT MEMORY ACCESS

[75] Inventors: Hing Leung Yiu, Tsuen Wan; Andrew Chu, Teii Po, both of Hong Kong; Glen Zoerner, Austin, Tex.

[73] Assignee: Motorola, Inc., Schaumburg, Ill.

[21] Appl. No.: 440,960

[22] Filed: May 15, 1995

[51] Int. Cl.$^6$ .................................................. G09G 5/00
[52] U.S. Cl. ...................... 345/507; 395/842; 395/200.42
[58] Field of Search ..................... 345/132, 196, 345/87, 186, 192, 199, 145, 88, 89, 147, 148, 149, 507; 395/842, 200.42

[56] References Cited

U.S. PATENT DOCUMENTS

| | | | |
|---|---|---|---|
| 4,747,081 | 5/1988 | Heilveil et al. | 365/219 |
| 4,760,385 | 7/1988 | Jansson et al. | 345/145 |
| 5,091,721 | 2/1992 | Hamori | 345/189 |
| 5,111,190 | 5/1992 | Zenda | 345/132 |
| 5,122,783 | 6/1992 | Bassetti, Jr. | 345/88 |
| 5,134,391 | 7/1992 | Okada | 345/185 |
| 5,140,680 | 8/1992 | Best | 395/325 |
| 5,146,211 | 9/1992 | Adams et al. | 345/145 |
| 5,175,533 | 12/1992 | Krenik | 345/199 |
| 5,261,047 | 11/1993 | Rivshin | 395/163 |
| 5,265,218 | 11/1993 | Testa et al. | 395/325 |
| 5,309,168 | 5/1994 | Itoh et al. | 345/185 |
| 5,353,061 | 10/1994 | Rodriguez et al. | 348/409 |
| 5,376,949 | 12/1994 | Haigh et al. | 345/189 |
| 5,491,496 | 2/1996 | Tomioyasu | 345/89 |
| 5,559,532 | 9/1996 | Gardyne | 345/145 |
| 5,559,533 | 9/1996 | Hicok et al. | 345/145 |
| 5,583,530 | 12/1996 | Mano et al. | 345/89 |

OTHER PUBLICATIONS

Motorola Inc., 1990, MC68340 Integrated Processor User's Manual, pp. 6–1—6–2, Section 6., "Liquid Crystal Display Driver, Auto Display Off Real Time Clock . . . ".

Kenneth L. Short, Microprocessors and Programmed Logic, pp. 73, 387, 390–391, 540–545, 353–355, 1987.

Primary Examiner—Richard A. Hjerpe
Assistant Examiner—Ricardo Osorio
Attorney, Agent, or Firm—Daniel D. Hill

[57] ABSTRACT

A data processing system (20) has a display controller (28) that uses bus arbitration and data bursting to supply display data for refreshing an LCD screen (49), utilizing a system memory (30) instead of a separate video RAM. A screen DMA (58) fills a line buffer (60) with display data from the system memory (30) in bursts of a predetermined number of words. The screen DMA (58) receives a faster clocking signal than is used by the CPU (22). This allows the screen DMA (58) to run faster than the CPU (22) to reduce bandwidth needed to retrieve the display data. In addition, if the CPU (22) clock frequency is changed for power management purposes, the LCD screen (49) is not affected since it uses a different clock. By using the system memory (30) for storing display data, pin count, packaging costs, and board space are reduced.

9 Claims, 4 Drawing Sheets

5,859,649

DATA PROCESSING SYSTEM HAVING DISPLAY CONTROLLER WITH BURSTING DIRECT MEMORY ACCESS

FIELD OF THE INVENTION

This invention relates generally to data processing, and more particularly, to a data processing system having a display controller with bursting direct memory access.

BACKGROUND OF THE INVENTION

A liquid crystal display (LCD) screen is commonly used to display data and/or graphics generated by a data processing system. An LCD screen is typically used in applications requiring small size and relatively low power consumption. A separate LCD controller is typically used for interfacing the LCD screen to the data processing system, and an external video memory is used to stored the display data for refreshing the LCD screen. However, the use of an external video memory increases pin count, board size, packaging costs, and power consumption of the data processing system.

DESCRIPTION OF A PREFERRED EMBODIMENT

Generally, the present invention provides a data processing system having a display controller that uses bus arbitration and data bursting to supply display data for refreshing pixels on a display screen, such as an LCD display screen, utilizing system memory instead of a separate video RAM (random access memory). The system memory is shared between the display controller and a centrol processing unit (CPU). A screen DMA (direct memory access) controller fills a line buffer with display data from the system memory in bursts of a predetermined number of words. The screen DMA controller is a general purpose, fly-by type, bursting DMA controller. An LCD control logic circuit pumps the display data from the line buffer through a cursor logic circuit, a frame rate control circuit, and an interface circuit to refresh the LCD display screen.

The screen DMA controller receives a faster clocking signal than is used by the CPU or the LCD control logic. This allows the screen DMA controller to run faster than the CPU to reduce the bandwidth needed to retrieve the display data. In addition, if the CPU clock frequency is changed for power management purposes, the LCD display screen is not affected since it uses a different clock. The CPU, the display controller, and the system memory an on the same integrated circuit in the illustrated embodiment. By using the system memory for storing display data, pin count, packaging costs, board space, and power consumption are reduced, making the DMA controller especially useful for hand-held, battery operated devices such as pagers, wireless telephones, pocket game machines, and the like.

The terms "assert" and "negate" will be used when referring to the rendering of a signal, status bit, or similar apparatus into its logically true or logically false state, respectively. If the logically true state is a digital logic level one, the logically false state will be a digital logic level zero. And if the logically true state is a digital logic level zero, the logically false state will be a digital logic level one. The term "bus" will be used to refer to a plurality of signals which may be used to transfer one or more various types of information, such as data, addresses, control, or status.

Figure 1:
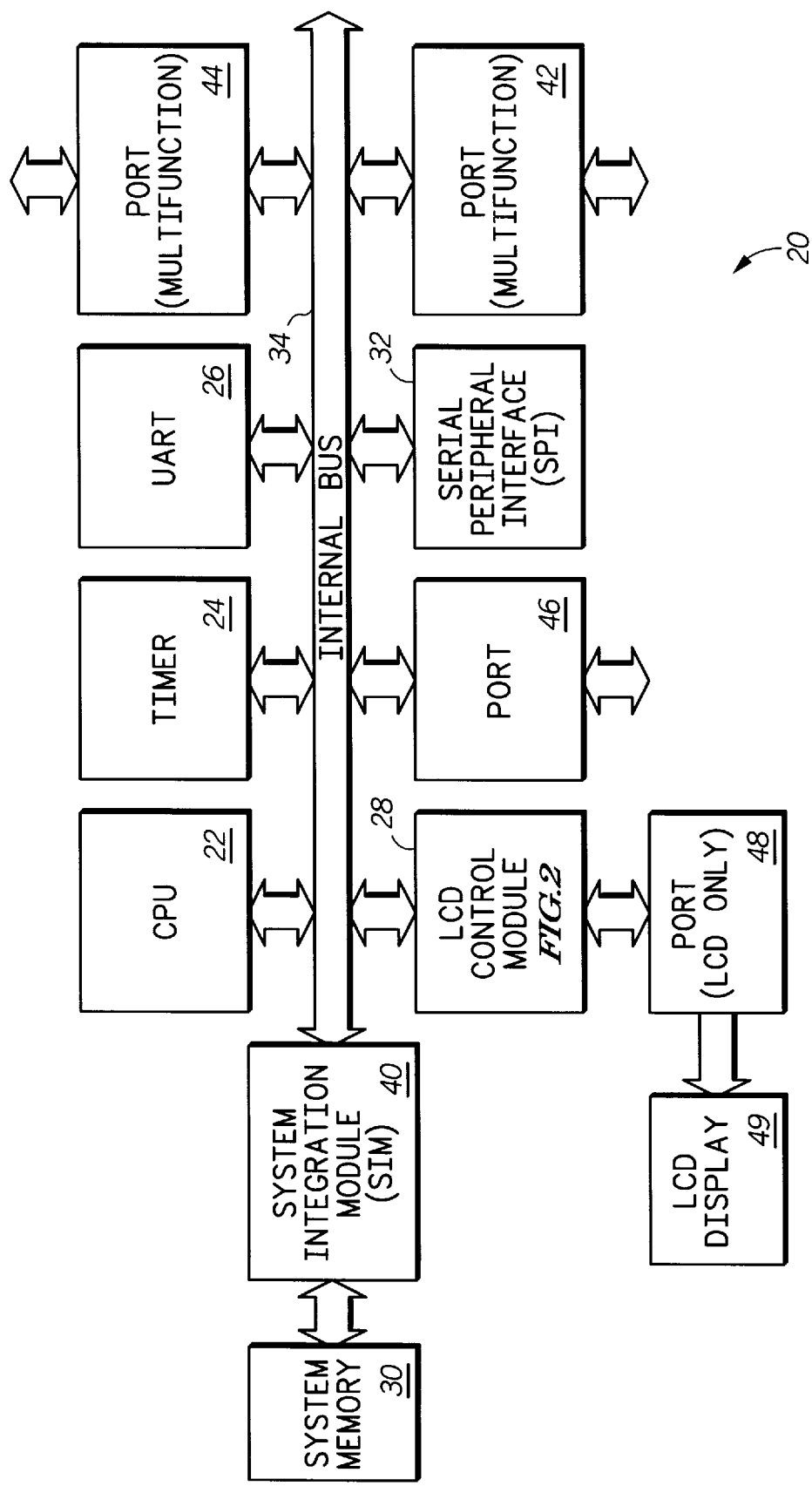
FIG. 1 illustrates, in block diagram form, an embodiment of a data processing system in accordance with the present invention.

The present invention can be more fully described with reference to FIGS. 1–4. FIG. 1 illustrates, in block diagram form, data processing system 20 in accordance with the present invention. Data processing system 20 includes central processing unit (CPU) 22, timer 24, universal asynchronous receiver/transmitter (UART) module 26, LCD control module 28, serial peripheral interface (SPI) 32, internal information bus circuit 34, system integration module (SIM) 40, and multi-function ports 42, and 44, and ports 46 and 48.

SIM 40 is connected to internal bus circuit 34 and can receive and transmit signals to data processing system 20 by way of internal bus circuit 34 or to circuits external to data processing system 20. System memory 30 is connected to data processing system 20 via SIM 40. Multi-functional ports 42 and 44 can receive and transmit signals external to data processing system 20 and are connected to internal bus circuit 34. Ports 46 and 48 can receive and transmit signals external to data processing system 20 and are connected to internal bus circuit 34. Ports 42, 44, and 46 are multipurpose parallel bi-directional ports for transmitting and receiving signals external to data processing system 20, such as keyboards, external memory, DSPs (digital signal processors), modems, and the like. Port 48 is for transmitting display data to the LCD display 49. Ports 42, 44, 46, and 48 may be coupled to integrated circuit pins, pads, or other types of terminals for transmitting and receiving signals external to data processing system 20. SIM 40 can receive and transmit signals to any of the other modules connected to internal bus circuit 34.

CPU 22 is connected to internal bus circuit 34 and may receive and transmit signals to each of the other modules connected to internal bus circuit 34. CPU 22 may optionally receive and transmit signals external to data processing system 20 by way of SIM 40. The CPU is usually responsible for receiving, interpreting, and executing the software instructions used to control the data processing system. UART 26 is connected to internal bus circuit 43. UART 26 supports asynchronous serial communications with external devices such as modems and other data processing systems at standard baud rates.

SPI 32 can receive and transmit signals external to data processing system 20 and with other modules via internal bus circuit 34. SPI 32 is a master/slave serial peripheral interface for communicating with external devices such as analog-to-digital converters, non-volatile memory devices, and other data processing systems. System memory 30 is bi-directionally connected to SIM 40. System memory 30 is a conventional memory unit comprising an array of static random access memory cells organized in rows and columns. System memory 30 may be external to data processing system 20, or may be on the same integrated circuit as data processing system 20. In the illustrated embodiment, system memory 30 is an external memory unit. Timer 24 is connected to internal bus circuit 34, and communicates with other modules of data processing system 20 via internal bus circuit 34.

LCD control module 28 is connected to internal bus circuit 34. LCD control module 28 provides control functions for refreshing an LCD display screen connected to port 48. LCD control module 28 will be described in more detail in the discussion of FIG. 2.

The embodiment of data processing system 20 which is shown in FIG. 1 illustrates one particular microprocessor within a family of microprocessors. Because microprocessors in the same family generally have a plurality of differing on-board peripherals, or modules, FIG. 1 illustrates only one embodiment of data processing system 20. Alternate embodiments of data processing system 20 may have fewer, more, or different on-board peripherals than those illustrated in FIG. 1.

Figure 2:
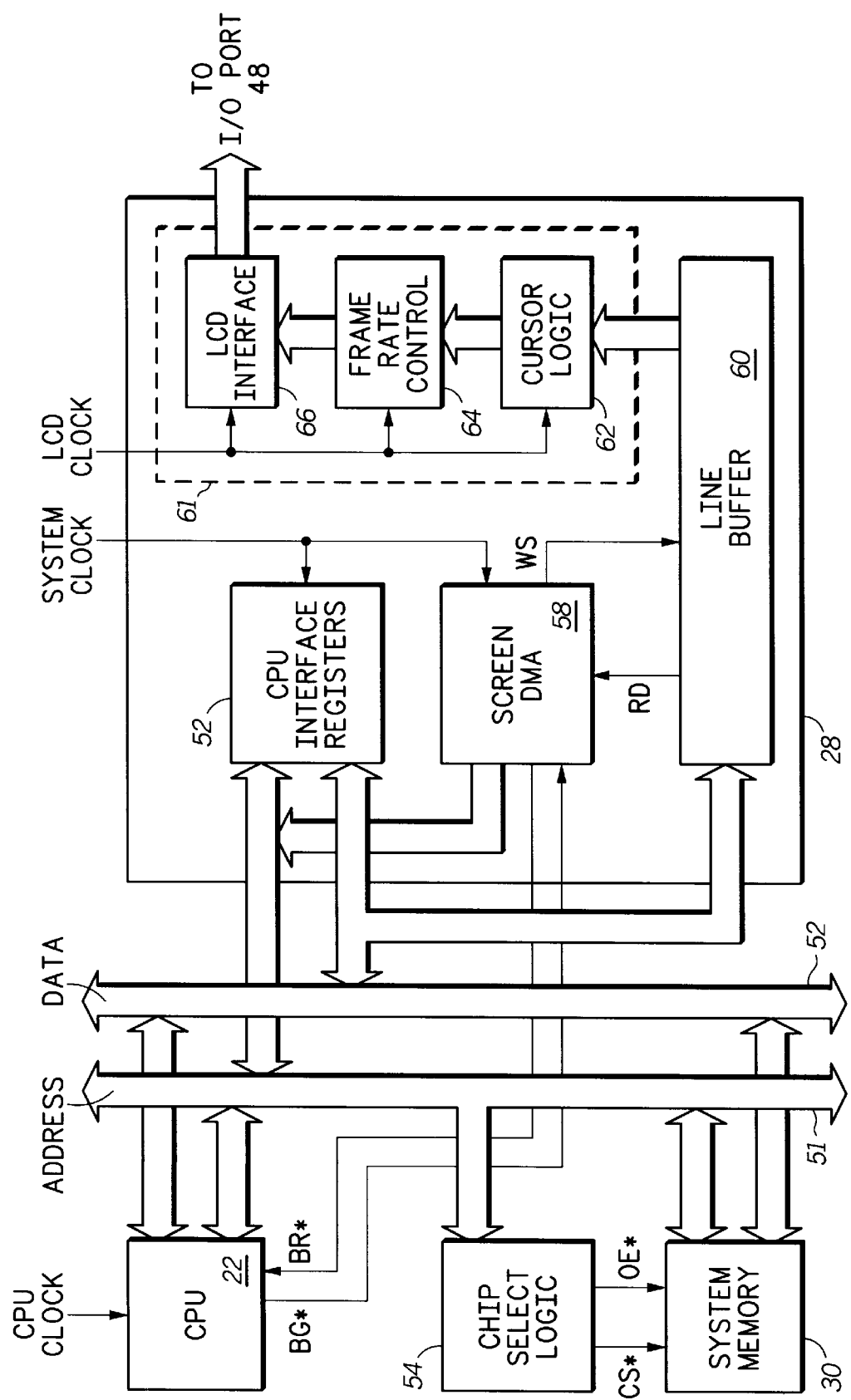
FIG. 2 illustrates, in block diagram form, a portion of the data processing system of FIG. 1.

FIG. 2 illustrates, in block diagram form, a portion of data processing system 20 of FIG. 1. LCD control module 28 includes CPU interface registers 56, screen direct memory access (DMA) controller 58, line buffer 60, and display control block 61. Display control block 61 includes cursor logic 62, frame rate controller 64, and LCD interface 66. Screen DMA controller 58 is a general purpose, fly-by type, 16-bit wide bursting DMA. Chip select logic 54 is a portion of SIM 40 (FIG. 1). Internal bus circuit 34 (also shown in FIG. 1) includes an address bus 51, and a data bus 52.

CPU 22 has an input terminal for receiving a clock signal labeled "CPU CLOCK", a plurality of bi-directional terminals connected to address bus 51, an input terminal for receiving a bus request signal labeled "BR*", an output terminal for providing a bus ready signal labeled "BG*", and a plurality of bi-directional terminals connected to data bus 52. Chip select logic 54 is a portion of SIM 40 illustrated in FIG. 1, and has a plurality of input terminals connected to address bus 51, a first output terminal for providing a chip select signal labeled "CS*", and a second output terminal for providing an output enable signal labeled "OE*" Note that an asterisk (*) after a signal name indicates that the signal is active as a logic zero. System memory 30 has a first input terminal connected to the first output terminal of chip select logic 54 for receiving chip signal CS*, a second input terminal connected to the second output terminal of chip select logic 54 for receiving output enable signal OE*, a plurality of bi-directional terminals connected to address bus 51, and a plurality of bi-directional terminals connected to data bus 52.

CPU interface registers 56 have a plurality of bi-directional terminals connected to address bus 51, a plurality of bi-directional terminals connected to data bus 52, and an input terminal for receiving a clock signal labeled "SYSTEM CLOCK". Screen DMA 58 has a plurality of output terminals connected to address bus 51, a first output terminal for providing bus request signal BR*, a second output terminal for providing a write strobe labeled "WS", a first input terminal for receiving bus grant signal BG*, a second input terminal for receiving a request data control signal labeled "RD", and a third input terminal for receiving clock signal SYSTEM CLOCK. Line buffer 60 has a plurality of input terminals connected to data bus 52, an output terminal for providing the request data control signal RD, an input terminal for receiving write strobe WS, and a plurality of output terminals.

In display control block 61, cursor logic 62 has a plurality of input terminals connected to the output terminals of line buffer 60, a plurality of output terminals, and an input terminal for receiving a clock signal labeled "LCD CLOCK". Frame rate controller 64 has an input terminal for receiving clock signal LCD CLOCK, a plurality of input terminals connected to the plurality of output terminals of cursor logic 62, and a plurality of output terminals. LCD interface 66 has a plurality of input terminals connected to the output terminals of frame rate controller 64, and a plurality of output terminals connected to port 48.

Figure 3:
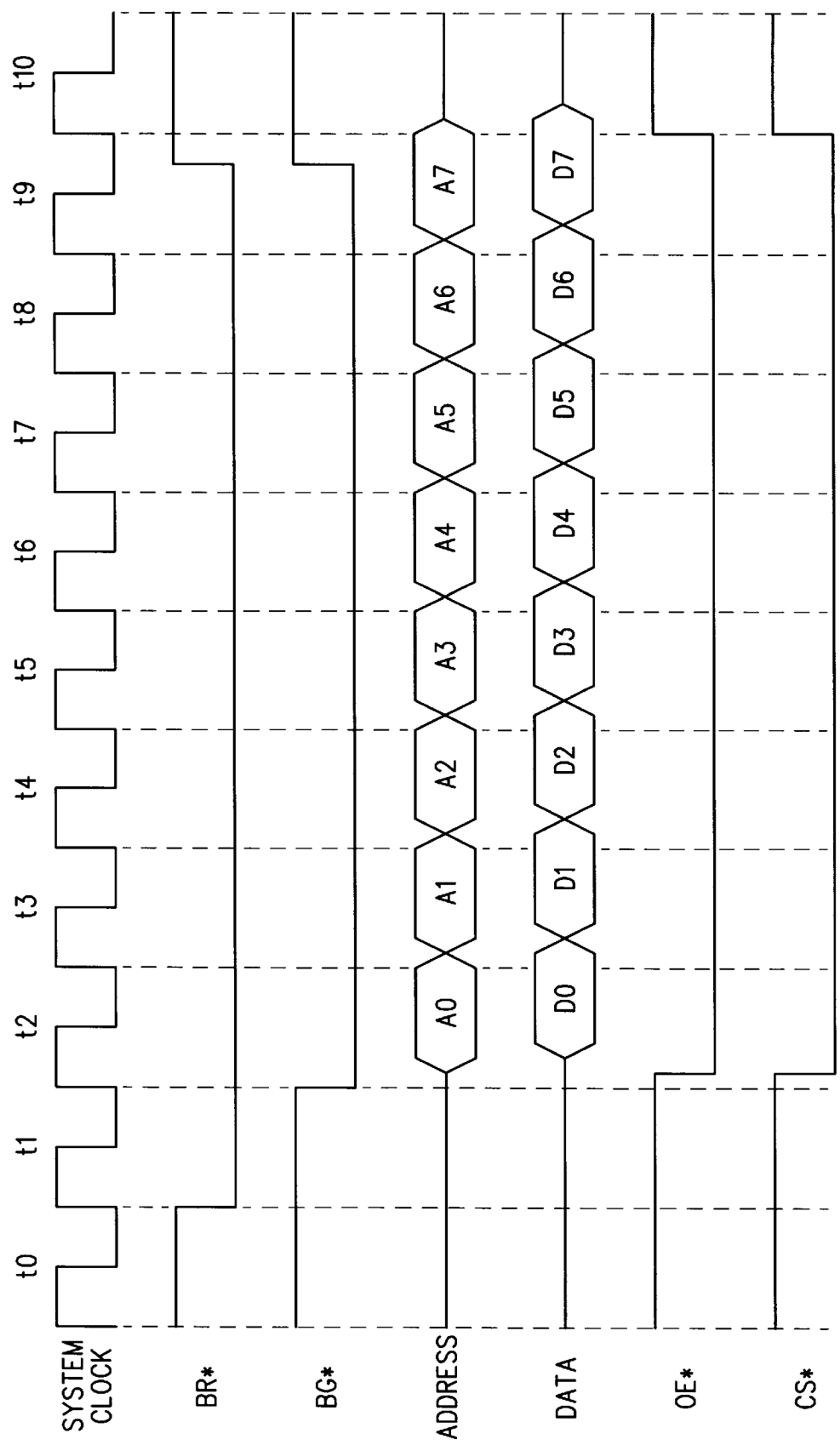
FIG. 3 illustrates a timing diagram of various signals of the data processing system of FIG. 1.

FIG. 3 is a timing diagram of various signals of the data processing system of FIG. 1. Each clock cycle of clock signal SYSTEM CLOCK is labeled with a "t" followed by a number. Referring to both FIG. 2 and FIG. 3, LCD control module 28 uses both bus arbitration and data bursting to supply display data to line buffer 60 from system memory 30, as needed to refresh LCD screen 49. Line buffer 60 essentially comprises two or more line buffers and operate similarly to a first-in, first-out (FIFO) buffer. While display data is being pumped to LCD display 49 by display control block 61 from one of the line buffers of line buffer 61, the other line buffer can be updated from system memory 30. When line buffer 61 is empty, or almost empty, line buffer 60 asserts request data signal RD as a logic one to screen DMA 58. Screen DMA 58 fills line buffer 60 with display data from system memory 30 in bursts of a predetermined number of words. The predetermined number bursts can be either 8 or 16 in the illustrated embodiment. However, in other embodiments, the number of bursts can be different. Screen DMA 58 asserts bus request BR* to CPU 22 as illustrated at clock cycle t1 of FIG. 3. When internal bus circuit 34 is available, CPU 22 asserts bus grant signal BG* as a logic zero as illustrated at the beginning of clock cycle t1. Note that in FIG. 3, the bus grant signal is illustrated as occurring one clock cycle after the bus request signal is asserted. However, several arbitration states may occur between bus request and bus grant. Also, if CPU 22 is in a power reduction mode, bus grant signal BG* may already be a logic zero, in which case, less than one cycle may be required for a bus grant signal to be asserted.

Beginning at clock cycle t2, eight words are burst from system memory 30 to line buffer 60. At clock cycle t2, a base address, labeled "A0" is provided by screen DMA 58 to system memory 30 via address bus 51. Also, chip select logic 54 asserts chip select signal CS* and output enable signal OE* to select system memory 30. Data signals labeled "D0", corresponding to base address A0, are read from system memory 30 and written to line buffer 60. Screen DMA 58 then increments the base address A0 to generate an address labeled "A1". Address A1 is provided to system memory 30, and data signals labeled "D1" are written to line buffer 60. The data burst continues from clock cycle t4 to clock cycle t9 for address signals A2–A7 to retrieve corresponding display data signals D2–D7. After the data burst is complete, LCD control module 28 relinquishes control of internal bus circuit 34.

To reduce bandwidth needed to retrieve the display data, Clock signal SYSTEM CLOCK is provided at a higher frequency than clock signals CPU CLOCK and LCD CLOCK. This allows screen DMA 58 to run faster than CPU 22. In addition, if the CPU clock frequency is changed for power management purposes, the LCD display screen is not affected since it operates from a different clock.

The display data is provided by line buffer 60 to cursor logic 62, frame rate control 64, and LCD interface 66. These blocks provide conventional display control logic for common LCD drivers. In the illustrated embodiment, LCD display 49 is a conventional monochrome LCD panel having a screen size of from 320×240 pixels to a screen size of 1024×512 pixels.

LCD control logic 61 pumps the display data through cursor logic 62, frame rate control 64, and LCD interface 66 to refresh the LCD display screen. Cursor logic 62 receives the display data and controls a location of a cursor on the display screen. Cursor logic 62 includes a vertical line counter and a horizontal pixel counter to specify the screen position of the cursor. Frame rate control 64 receives the display data and determines display rate timing for updating the display screen. The display rate depends of the display rate requirements of the specific LCD screen used. LCD interface 66 interfaces LCD display 49 to LCD control module 28 via port 48.

Figure 4:
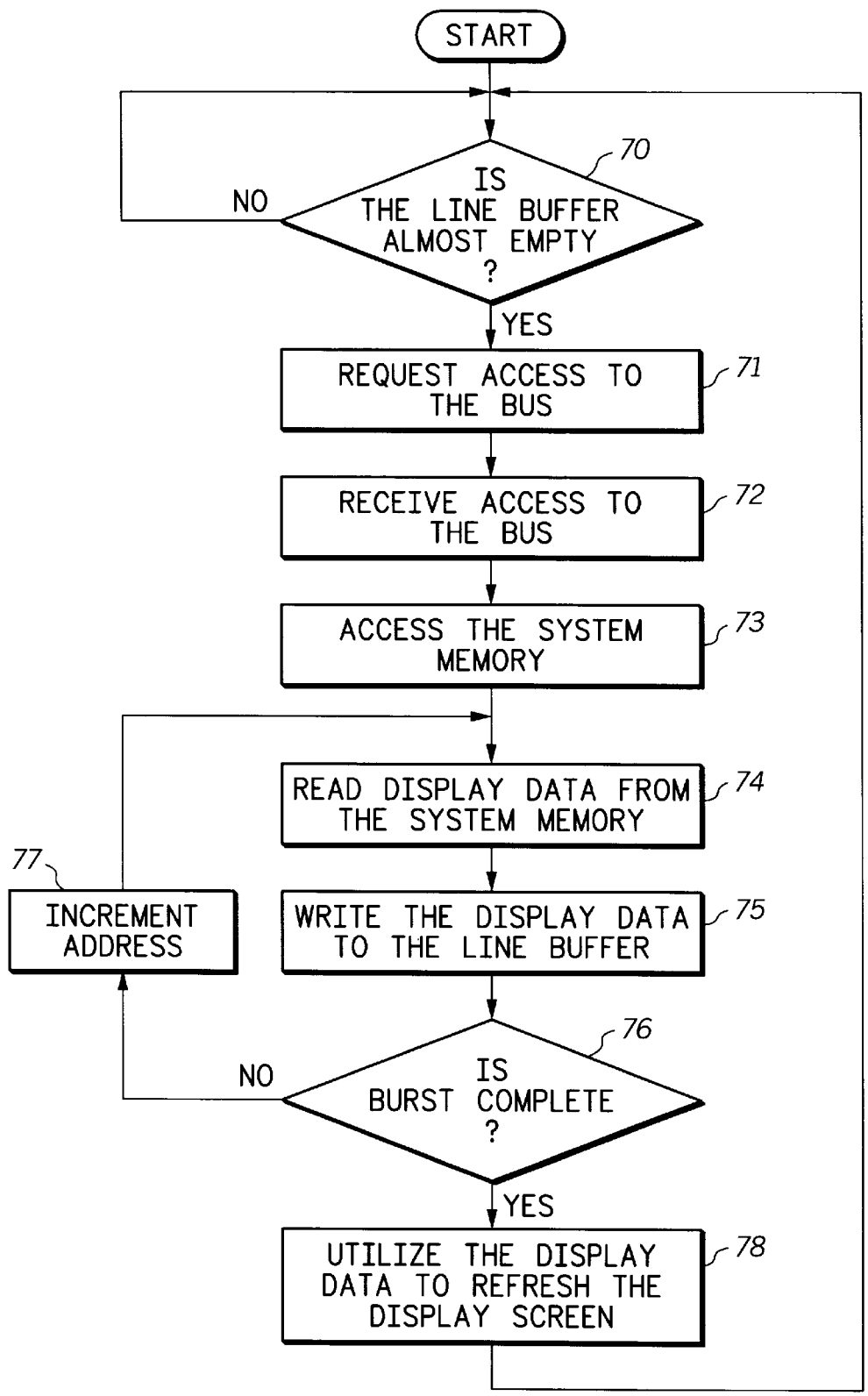
FIG. 4 illustrates a flow chart of the operation of the data processing system of FIG. 1.

FIG. 4 illustrates a flow chart of the operation of data processing system 20 of FIG. 1 when LCD control module 28 retrieves display data from system memory 30. Diamond-shaped boxes 70 and 76 represent decision steps, and rectangular boxes 71, 72, 73, 74, 75, 77, and 78 represent steps which are performed in the retrieve operation. At step 70, the contents of line buffer 60 are continuously monitored. When line buffer 60 is almost empty, the "YES" path is taken to step 71. At step 71, LCD control module 28 requests access to internal bus circuit 34 by asserting bus request signal BR*. At step 72, access to internal bus circuit 34 is granted, and bus grant signal BG* is asserted. At step 73, screen DMA 58 accesses system memory 30 at a base address from which to begin bursting display data to line buffer 60. At step 74, display data is read from system memory 30. At step 75, the display data is written to line buffer 60 in a predetermined number of bursts.

At decision step 76, it is determined if the burst is complete by checking the value of a counter (not shown) used to increment the base address. If the burst in not complete, the "NO" path is taken to step 77, the previous address is incremented, and display data is retrieved from system memory 30 by repeating steps 74 and 75. When the burst is complete, the "YES" path is taken to step 78 and the display data is used to refresh LCD display screen 49 as described above.

To reduce pin count, packaging cost, as well as board space, LCD display control module 28 retrieves data directly from system memory 30 instead of employing a separate video random access memory. LCD control module 28 and CPU 22 are timed using separate clock signals so that the LCD control module may operate faster than CPU 22, reducing the bandwidth required by LCD control module 28.

While the invention has been described in the context of a preferred embodiment, it will be apparent to those skilled in the art that the present invention may be modified in numerous ways and may assume many embodiments other than that specifically set out and described above. For example, in the illustrated embodiment, an LCD screen is used. However, in other embodiments, a different type of display screen may be used, such as an LED (light emitting diode) screen. Accordingly, it is intended by the appended claims to cover all modifications of the invention which fall within the true spirit and scope of the invention.

What is claimed is:

1. A data processing system, comprising:

a central processing unit, coupled to a bus for executing instructions retrieved from a memory unit, the central processing unit receiving a first clock signal at a first frequency;

a direct memory access controller, coupled to the bus, for fetching display data from the memory unit, the direct memory access controller receiving a second clock signal at a second frequency that is different from the first frequency, and the direct memory access controller operating independently of the central processing unit, wherein the display data is for refreshing a liquid crystal display screen;

a line buffer, coupled to the memory unit, for storing the display data fetched from the memory unit; and a liquid crystal display control block, coupled to the line buffer, for receiving the display data and a third clock signal, the display control block for refreshing the liquid crystal display screen, wherein the third clock signal is provided at a third frequency different from the second frequency.

2. A data processing system as in claim 1, wherein the direct memory access controller retrieves the display data in a predetermined number of bursts.

3. A data processing system as in claim 1, wherein the display control block comprising;

cursor logic, coupled to the line buffer, for receiving the display data and controlling a location of a cursor on the display screen;

a frame rate controller, coupled to the line buffer and to the cursor logic, for receiving the display data and determining a display timing for updating the display screen; and liquid crystal display interface, coupled to the frame rate controller and to the display screen, for interfacing the display screen to the display controller.

4. A data processing system, comprising:

a central processing unit, coupled to a bus, for executing instructions retrieved from a memory, the central processing unit receiving a first clock signal at a first frequency;

a liquid crystal display controller, coupled to the bus, the liquid crystal display controller comprising:

a direct memory access controller for accessing the memory for retrieving display data, the direct memory access controller receiving a second clock signal at a second frequency that is different from the first frequency;

a line buffer, coupled to the bus and to the direct memory access controller, for storing the display data retrieved from the memory, the display data for periodically refreshing a liquid crystal display screen; and a liquid crystal display control block, coupled to the line buffer, for receiving the display data and a third clock signal, the liquid crystal display control block for refreshing the liquid crystal display screen using the display data, wherein the third clock signal is provided at a third frequency different from the second frequency.

5. A data processing system as in claim 4, wherein the direct memory access controller retrieves the display data in a predetermined number of bursts.

6. A data processing system as in claim 4, wherein the display control block comprising:

cursor logic, coupled to the line buffer, for receiving the display data and controlling a location of a cursor on the display screen;

a frame rate controller, coupled to the line buffer and to the cursor logic, for receiving the display data and determining a display timing for updating the display screen; and liquid crystal display interface, coupled to the frame rate controller and to the display screen, for interfacing the display screen to the display controller.

7. A data processing system as in claim 4, wherein the bus comprises an address bus and a data bus, the address bus and the data bus coupled to the central processing unit, the display controller, and the memory unit, the central processing unit and the display controller arbitrating for use of the bus, the bus for transferring the instructions to the central processing unit when the central processing unit has the use of the bus, and the bus for transferring the display data to the display controller when the display controller has the use of the bus.

8. In a data processing system having a central processing unit, and a liquid crystal display controller for controlling a liquid crystal display, the central processing unit and liquid crystal display controller coupled to a bus, a method for periodically supplying display data for refreshing the liquid crystal display and instructions for execution by the central processing unit, the method comprising the steps of:

requesting access to the bus;

receiving access to the bus;

enabling a system memory for a read access from the system memory;

reading the display data from the system memory at a first frequency, the first frequency being different from an operating frequency of the central processing unit, wherein the display data being read from the system memory in a predetermined number of bursts; and writing the predetermined number of bursts of display data to a line buffer of the liquid crystal display controller; and using the display data in a display control block to refresh the display screen, the display control block operating at a second frequency different from the first frequency.

9. A method as in claim 8, wherein the step of requesting access to the bus further comprises requesting access to the bus when the line buffer is ready to accept the display data.

* * * * *